(12) United States Patent
Jia et al.

(10) Patent No.: US 12,445,894 B2
(45) Date of Patent: Oct. 14, 2025

(54) INTELLIGENT TRAFFIC SWITCH BETWEEN NETWORKS

(71) Applicant: AT&T Intellectual Property I, L.P., Atlanta, GA (US)

(72) Inventors: Yupeng Jia, South Pasadena, CA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 414 days.

(21) Appl. No.: 17/952,877

(22) Filed: Sep. 26, 2022

(65) Prior Publication Data

US 2024/0107359 A1  Mar. 28, 2024

(51) Int. Cl.
*H04W 28/02* (2009.01)
*H04W 84/12* (2009.01)

(52) U.S. Cl.
CPC ........ *H04W 28/0242* (2013.01); *H04W 84/12* (2013.01)

(58) Field of Classification Search
CPC .. H04W 28/0242; H04W 84/12; H04W 88/06
See application file for complete search history.

(56) References Cited

U.S. PATENT DOCUMENTS

2015/0003420 A1 * 1/2015 Vangala ................ H04W 36/22
  370/333
2021/0185600 A1 * 6/2021 Smith ..................... H04L 45/24

FOREIGN PATENT DOCUMENTS

EP 2461631 A2 * 6/2012 ............ H04W 52/02

* cited by examiner

*Primary Examiner* — Mohammad S Anwar
(74) *Attorney, Agent, or Firm* — Guntin & Gust, PLC; Daniel Williams

(57) ABSTRACT

Aspects of the subject disclosure may include, for example, selecting a latency comparison, a throughput comparison, a security comparison, a reliability comparison, movement information or a combination thereof for an end user device executing a communication service according to a service type resulting in a selection criteria, wherein the comparisons are evaluations of each of different available connections; and generating a switching decision by selecting one of the connections. Other embodiments are disclosed.

20 Claims, 7 Drawing Sheets

300

INTELLIGENT TRAFFIC SWITCH BETWEEN NETWORKS

FIELD OF THE DISCLOSURE

The subject disclosure relates to an intelligent traffic switch between networks.

BACKGROUND

As more devices are connected to networks (e.g., cellular networks), the burden on a data network will continue to increase. Complementary networks (e.g., a WiFi network) can be a complementary way to keep mobile devices connected and can offload mobile data to help ease the congestion.

BRIEF DESCRIPTION OF THE DRAWINGS

Reference will now be made to the accompanying drawings, which are not necessarily drawn to scale, and wherein.

DETAILED DESCRIPTION

Figure 1:
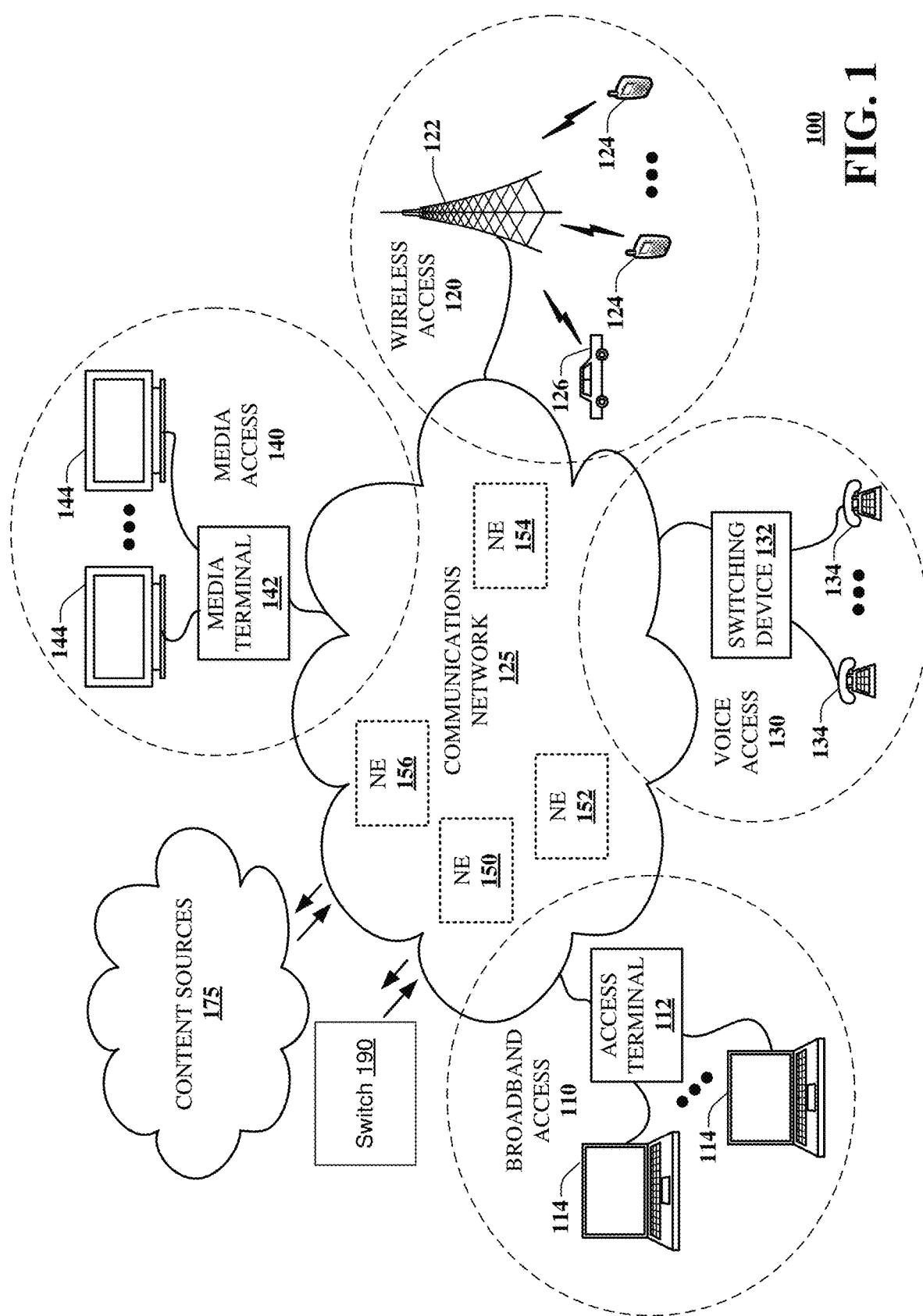
FIG. 1 is a block diagram illustrating an exemplary, non-limiting embodiment of a communications network in accordance with various aspects described herein.

The subject disclosure describes, among other things, illustrative embodiments for selectively accessing different networks to maximize a user experience. In one or more embodiments, a dynamic switch can control utilizing a first connection to a first access network (e.g., a cellular network) or a second connection to a second access network (e.g., a WiFi network provided by a WiFi hotspot), instead of a static configuration. In one or more embodiments, various criterion or combinations of criteria can be used for determining the connection and thus the network to utilize for a particular communication service. In one embodiment, a speed (downlink and/or uplink) estimation, measurement or prediction can be made allowing for a dynamic measurement and triggering of a WiFi-cellular switch (or switch between other network types). In one or more embodiments, a beacon signal can be used to probe one or more parameters of the connections and networks, such as probing WiFi and cellular throughput, to allow for real-time data-driven decision-making for switching the connections.

In one or more embodiments, best effort services are provided for broadband connection to ensure metaverse can operate on best available, most reliable, high throughput and bounded latency networks (e.g., WiFi and cellular networks). In one or more embodiments, the performance of delay-sensitive services can be improved via a WiFi-cellular intelligent switch to avoid service discontinuity. Various embodiments described herein utilize cellular and WiFi as examples of the different networks that can be accessed, however, other embodiments can enable selection between networks which may or may not include cellular and WiFi, such as wireless LAN, wireless MAN, wireless PAN, wireless WAN, and the various current and future protocols and technologies that support these networks including WiMAX, Bluetooth, Zigbee, IR, LTE and so forth.

In one or more embodiments, an intelligent WiFi-cellular network switch(es) is provided (at the user device and/or at network element(s)) to optimize or improve a user experience using a communication service (e.g., voice, video, data, messaging, and so forth) where the criterion (or combination of criteria) to trigger or hold the switch can vary. In one or more embodiments, the switching criteria can include measurement or prediction of RF conditions for the different available networks and/or the different available paths (which may include end-to-end performance parameters over the path).

One or more of the embodiments can provide various services to end user devices (e.g., mobile phones, laptop computers, IoT devices, XR devices including XR headsets, and other computing devices that execute communication services) including metaverse services, such as interconnection to virtual worlds (e.g., Extended Reality (XR), Augmented Reality (AR), Virtual Reality (VR) and/or Mixed Reality (MR) services), as well as other communication services including voice, video, data and/or messaging.

In one or more embodiments, a delay-sensitive service-aware WiFi-cellular switch can be provided which can be used for metaverse services (e.g., latency-sensitive services) whereby probing of the end-to-end latency on the WiFi connection and cellular connection allows for a performance evaluation so that a decision can be made to switch or stay on the current connection. In one or more embodiments, a throughput-aware WiFi-cellular switch can be provided which can be used for metaverse services (e.g., data-centric services) whereby probing the downlink and uplink throughput on the WiFi connection and cellular connection allows for a performance evaluation so that a decision can be made to switch or stay on a current connection. In one or more embodiments, a motion-aware WiFi-cellular switch can be provided which can be used for metaverse services whereby motion information, such as motion detection of a UE and a forecast UE speed and/or trajectory allows for a performance evaluation so that a decision can be made to stay on a WiFi network (e.g., current connection if static or low mobility) or switch to a cellular network (e.g., mobile device positioned at or forecast to be moving towards the WiFi coverage edge).

In one or more embodiments, the network(s) or devices attached to the network(s) (which can include the end user device) can probe network parameters such as the downlink and uplink throughput and/or the latency in the available networks/connections (e.g., WiFi and cellular connections) to facilitate data-driven real time switching decisions. This can enable or facilitate providing a best available network for various services including metaverse services that can take into account, or otherwise seek to obtain, bounded latency, high reliability and/or high throughput (including providing a balance between these parameters). In one or more embodiments, a dynamic switch can be provided between WiFi-cellular to ensure a best user experience instead of a static WiFi-preferred switch in WiFi-offloading scenarios.

One or more embodiments enable efficient and fast data offloading, such as to a WiFi network, which may be done with or without notification to the user at the end user device. One or embodiments herein improve on a switch and authentication to WiFi automatically (which is purely based on RF condition/threshold), since other parameters such as latency, throughput, actual network load, predicted network load, type of service, and/or user experience can be considered. In one or more embodiments, the switching between networks can ensure that users are provided with speeds and QoS that they expect or desire. For example, the switch can facilitate a connection to a 5G mmwave cellular network (e.g., providing multi-Gbps download speed and several hundred Mbps upload speed) which is selected over an available WiFi-offloading. In one or more embodiments, the end user device can be authenticated a first time when switching to a connection to the particular selected network and then the device can remember or otherwise expedite future connections and/or authentication to the network, such as for that communication session. Other embodiments are described in the subject disclosure.

One or more aspects of the subject disclosure include a device comprising: a processing system including a processor; and a memory that stores executable instructions that, when executed by the processing system, facilitate performance of operations. The operations can include determining a first end-to-end latency over a cellular connection for an end user device executing a communication service. The operations can include predicting a second end-to-end latency over a WiFi connection via a WiFi access point for the end user device executing the communication service. The operations can include comparing the first and second end-to-end latencies resulting in a latency comparison. The operations can include determining a first throughput over the cellular connection for the end user device executing the communication service. The operations can include predicting a second throughput over the WiFi connection via the WiFi access point for the end user device executing the communication service. The operations can include comparing the first and second throughputs resulting in a throughput comparison. The operations can include predicting movement information for the end user device executing the communication service relative to a coverage area of the WiFi access point. The operations can include generating a switching instruction according to the latency comparison, the throughput comparison, and the movement information, where the switching instruction selects one of the cellular connection or the WiFi connection. The operations can include transmitting the switching instruction to the end user device.

One or more aspects of the subject disclosure include a non-transitory machine-readable medium, comprising executable instructions that, when executed by a processing system including a processor of an end user device, facilitate performance of operations. The operations can include determining a service type for a communication service executing on an end user device. The operations can include selecting a latency comparison, a throughput comparison, movement information or a combination thereof for the end user device executing the communication service according to the service type for the communication service resulting in a selection criteria. The operations can include generating the latency comparison, the throughput comparison, the movement information or the combination thereof according to the selection criteria, where the latency comparison comprises determining a first latency over a cellular connection for the end user device executing the communication service, determining a second latency over a WiFi connection via a WiFi access point for the end user device executing the communication service, and comparing the first and second latencies, where the throughput comparison comprises determining a first throughput over the cellular connection for the end user device executing the communication service, determining a second throughput over the WiFi connection via the WiFi access point for the end user device executing the communication service, and comparing the first and second throughputs, and where the movement information is a prediction for the end user device executing the communication service relative to a coverage area of the WiFi access point. The operations can include generating a switching decision by selecting one of the cellular connection or the WiFi connection according to the latency comparison, the throughput comparison, the movement information, or the combination thereof.

One or more aspects of the subject disclosure is a method including determining, by a processor, a service type for a communication service executing on an end user device; selecting, by the processor, a latency comparison, a throughput comparison, a security comparison, a reliability comparison, movement information or a combination thereof for the end user device executing the communication service according to the service type resulting in a selection criteria, where the latency comparison is based on end-to-end latency measured over a cellular connection for the end user device executing the communication service and measured over a WiFi connection via a WiFi access point for the end user device executing the communication service, where the throughput comparison is based on throughput measured over the cellular connection for the end user device executing the communication service and measured over the WiFi connection via the WiFi access point for the end user device executing the communication service, where the throughput comparison is based on security ratings determined for the cellular connection for the end user device executing the communication service and determined for the WiFi connection via the WiFi access point for the end user device executing the communication service, where the reliability comparison is based on packet loss measured over the cellular connection for the end user device executing the communication service and measured over the WiFi connection via the WiFi access point for the end user device executing the communication service, where the movement information is a prediction for the end user device executing the communication service relative to a coverage area of the WiFi access point; and generating a switching decision by selecting one of the cellular connection or the WiFi connection according to an evaluation of the selection criteria.

Referring now to FIG. 1, a block diagram is shown illustrating an example, non-limiting embodiment of a system 100 in accordance with various aspects described herein. System 100 facilitates a communication service, provided to a user via an end user device, switching between different networks, including networks operating according to different wireless protocols. For example, a user device can switch or be switched between connections via different access agonistic networks to maximize the user experience. In one embodiment, a dynamic switch can be utilized to switch between a cellular network and a WiFi hotspot, instead of utilizing a static configuration.

System 100 can include a switch(es) 190, which can be a physical and/or logical switch(es). Switch(es) 190 can be positioned throughout the network, including at multiple positions such as at an end user device, at a core network, at an Application Server (AS), at a Radio Access Network (RAN), at an access point or hot spot (e.g., a WiFi access point), at or attached to a cellular network, at or attached to a WiFi network, at an edge device, at another type of network element, or combinations thereof. For example, system 100 via switch(es) 190 (operating alone or in conjunction with one or more other switches 190) can facilitate in whole or in part selecting a latency comparison, a throughput comparison, a security comparison, a reliability comparison, movement information or a combination thereof for an end user device executing a communication service according to a service type resulting in a selection criteria, where the latency comparison is based on end-to-end latency measured over a cellular connection and measured over a WiFi connection via a WiFi access point, where the throughput comparison is based on throughput measured over the cellular connection and measured over the WiFi connection via the WiFi access point, where the throughput comparison is based on security ratings determined for the cellular connection and determined for the WiFi connection via the WiFi access point, where the reliability comparison is based on packet loss measured over the cellular connection and measured over the WiFi connection via the WiFi access point, where the movement information is a prediction for the end user device relative to a coverage area of the WiFi access point; and generating a switching decision by selecting one of the cellular connection or the WiFi connection according to the latency comparison, the throughput comparison, the security comparison, the reliability comparison, the movement information, or the combination thereof.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
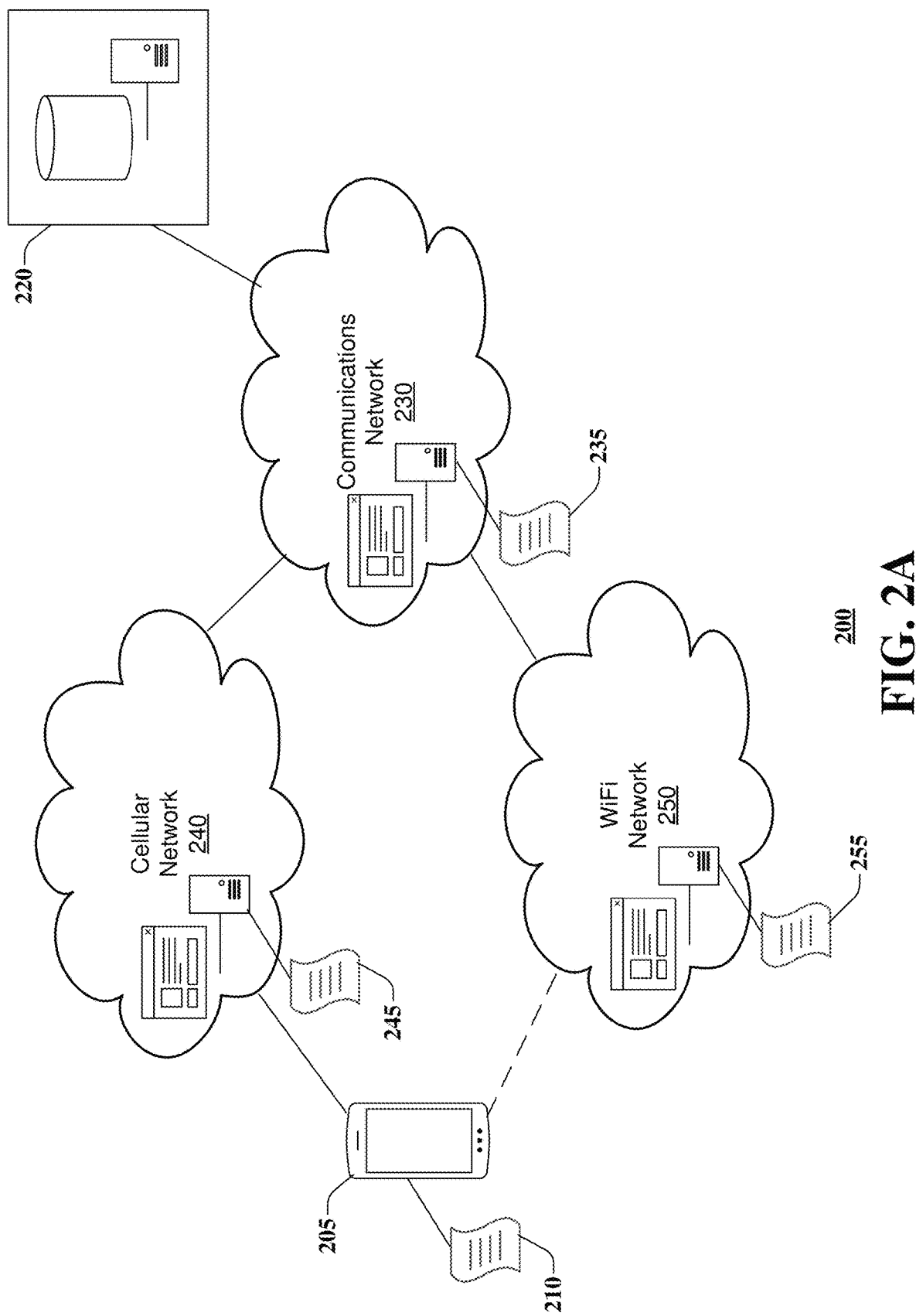
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 can include an intelligent network switch (e.g., a WiFi-cellular switch, although other networks utilizing other communication protocols and technologies can also be utilized in and switched between in system 200) to optimize or improve the user experience by dynamically switching to a particular network/connection as circumstances change, including as one or more parameters of the different connections/networks change. As an example, various criteria, alone or in combination with other criteria, can be utilized as a trigger to maintain the previous connection/network or switch to a different network/connection. In one or more embodiments, the criteria (which may or may not be considered in conjunction with an RF condition) for delay-sensitive services can include probing the end-to-end latency on the WiFi connection and cellular connection.

In one or more embodiments, the criteria (which may or may not be considered in conjunction with an RF condition) can include probing the DL and/or UL throughput on the WiFi connection and cellular connections. In one or more embodiments, the criteria (which may or may not be considered in conjunction with an RF condition) can include motion detection of UE and forecast UE speed. For example, a decision can be made to stay on the WiFi network (e.g., a current connection if static or low mobility) or switch to cellular network (e.g., mobile device forecast to or already at the WiFi coverage edge).

System 200 allows for the switch and/or the logic for making the switching determination to be at various devices, including one or more of: switch 210 at end user device 205, switch 235 at a network element of communications network 230 (e.g., a core or backbone network), switch 245 at a first wireless network 240 (e.g., a cellular network), and switch 255 at a second wireless network 250 (e.g., a WiFi network). It should be further understood that while two access networks are illustrated, any number of access networks can be available and selected from, and further that the access networks can be various types which may or may not be WiFi and cellular networks.

In this example of system 200, end user device 205 is executing a communication service utilizing communications with computing device 220. The communication service can be of various types as described herein including metaverse service, voice, video, data and/or messaging.

System 200 allows for probing of available networks and available connections, including one or more of downlink throughput, uplink throughput, latency, and/or RF conditions, as well as other parameters at or over each of the available connections to facilitate a data-driven real-time switching decision, which in this example can be between a WiFi connection and a cellular connection. As an example, one, some or all of switches 210, 235, 245, 255 can determine a first end-to-end latency over a cellular connection via network 240 for end user device 205; predict a second end-to-end latency over a WiFi connection via network 250 for the end user device; and compare the first and second end-to-end latencies resulting in a latency comparison. As another example, one, some or all of switches 210, 235, 245, 255 can determine a first throughput over the cellular connection via network 240 for the end user device 205; predict a second throughput over the WiFi connection via the network 250; and compare the first and second throughputs resulting in a throughput comparison. As another example, one, some or all of switches 210, 235, 245, 255 can predict movement information for the end user device 205 relative to a coverage area of the WiFi network 250. In one or more embodiments, one, some or all of switches 210, 235, 245, 255 can generate a switching instruction according to the one or more of the latency comparison, the throughput comparison, and the movement information, where the switching instruction selects one of the cellular connection or the WiFi connection, and where the switching instruction is implemented such as by transmitting it to the end user device or to a network element that controls switching.

In one embodiment, predicting of end-to-end latency and throughput over a WiFi connection can be based on a beacon signal of a WiFi access point, where transmitting of a switching instruction causes the end user device 205 to switch to the WiFi connection, and where a cellular connection is maintained after the end user device switches to the WiFi connection. In one or more embodiments, one, some or all of switches 210, 235, 245, 255 can determine a service type for the communication service executing on the end user device 205; and can select between uplink throughput and downlink throughput according to the service type for the parameter to be evaluated.

In one or more embodiments, one, some or all of switches 210, 235, 245, 255 can determine a first RF condition for signals over the cellular connection for the end user device 205 executing the communication service; predict a second RF condition for signals over the WiFi connection via the WiFi access point for the end user device executing the communication service, where the first and second RF conditions are a same type of parameter; and compare the first and second RF conditions resulting in an RF condition comparison, where the generating of the switching instruction is based in part on the RF condition comparison.

In one or more embodiments, one, some or all of switches 210, 235, 245, 255 can determine a service type for the communication service executing on the end user device 205; determine weights for each of a latency comparison, a throughput comparison, movement information, and an RF condition comparison resulting in a prioritization of criteria, where generating of a switching instruction is based in part on the weights. In one or more embodiments, one, some or all of switches 210, 235, 245, 255 can generate a switching instruction based in part on environment data captured by a sensor of the end user device 205, such as one or more images captured by a camera of the end user device. In one or more embodiments, one, some or all of switches 210, 235, 245, 255 can determine network conditions associated with a network providing the cellular connection; and determine available spectrum associated with the cellular connection, where the generating the switching instruction is based in part on the network conditions and the available spectrum.

Figure 2B:
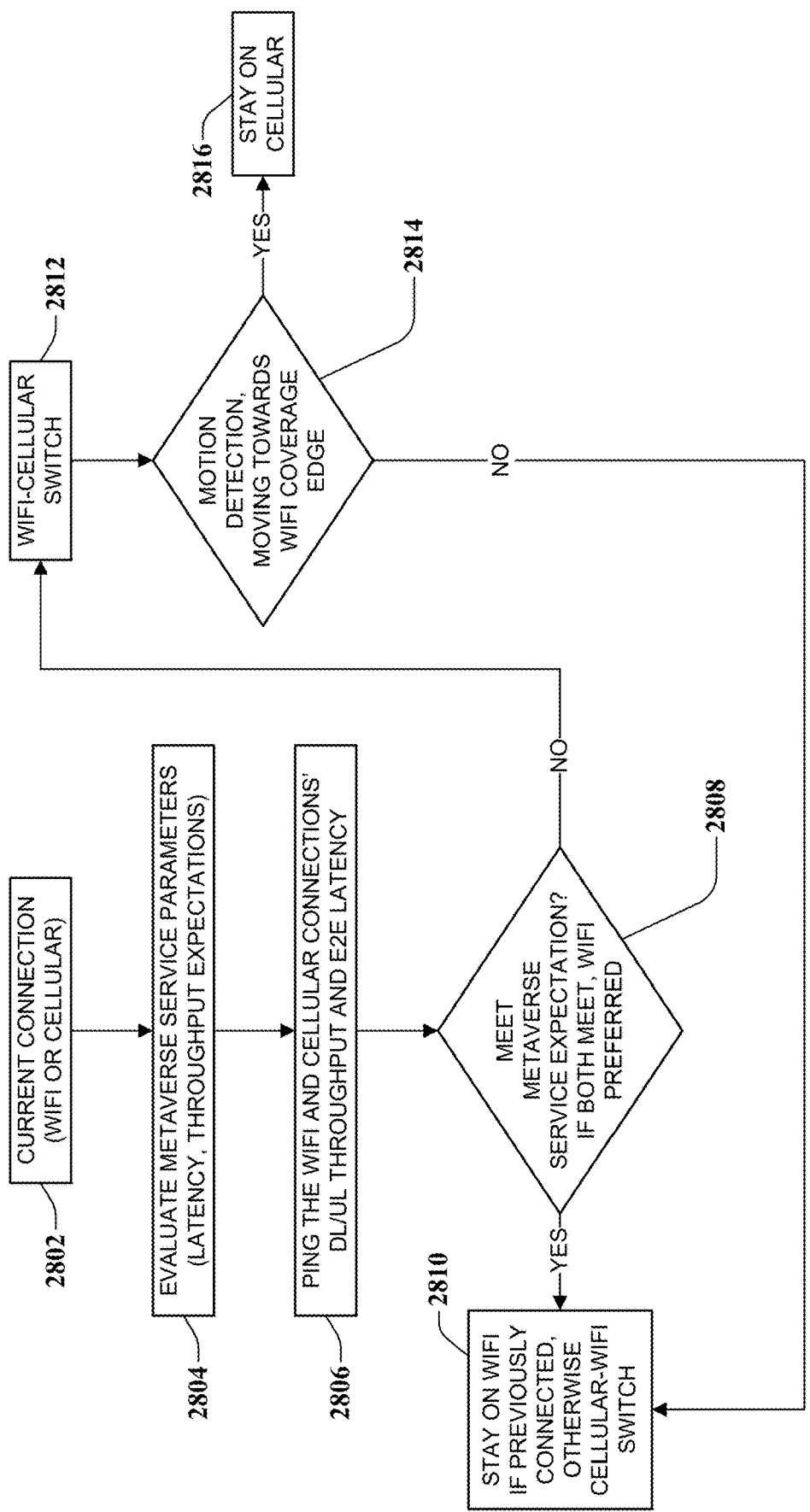
FIG. 2B depicts an illustrative embodiment of a method in accordance with various aspects described herein.

FIG. 2B depicts an illustrative embodiment of a method 280 in accordance with various aspects described herein. Method 280 can be performed in whole or in part (including adding, deleting and/or skipping steps) by various devices and combinations of devices, including an end user device, equipment at a core network, an Application Server, equipment at a RAN, an access point or hot spot (e.g., a WiFi access point), equipment at or attached to a cellular network, equipment at or attached to a WiFi network, an edge device, and/or another type of network element for various types of networks, in order to facilitate a communication service (e.g., voice, video, data, messaging, and so forth). The frequency at which one or more of the steps of method 280 are performed (e.g., the selection, collection and/or evaluation of parameters at 2802, 2804, 2806) can vary including being at a fixed time period or schedule or an adjustable time period. In one embodiment, the frequency of performing one or more of the steps of method 280 can be selected or can be adjusted according to network conditions, a type of communication service, a subscriber agreement, QoS requirements or guarantee, end user device capabilities, or other factors.

At 2802, a connection via a particular network can be established or provided for delivering a communication service to an end user device, such as a mobile phone obtaining a metaverse service or other communication service. The particular connection can be via cellular, WiFi or other network types.

At 2804, the service type can be identified or determined for the communication service executing on the end user device so that parameters can be selected. This can be done in a number of different ways, including analyzing user device information when the end user device initially requests access to the service, header information for packets being transmitted to or from the end user device, and so forth. In one embodiment, the parameters can include one or more of a latency comparison, a throughput comparison, a security comparison, a reliability comparison, movement information, or environment information, where the comparison includes comparing the particular parameters for each available path (e.g., cellular vs WiFi) over the end-to-end path or over a portion of the path. Other criterion (which may or may not consider the type of communication service), can also be selected for evaluation between paths such as one or more of RF conditions, predicted future RF conditions, other network conditions, predicted future other network conditions, available resources, predicted future available resources, subscriber agreement, QoS agreement or guarantee, service agreements with other network providers, and so forth.

At 2806, information or data for evaluating the selected parameter(s) can be obtained or collected, such as from beacon signals, pinging one or more network elements, or other techniques. The particular technique for obtaining the parameter data can depend on the type of network, the type of selected parameter, the type of communication service, the capabilities of the end user device, and so forth, such as determining latency and/or throughput through a pinging or beacon signal process, performing a security comparison according to historical information associated with the connections (e.g., information or statistics describing previous hacking attempts), performing an environmental analysis using sensors on the user device and determining a network and/or connection which is predicted to perform better in that environment, performing an RF condition comparison such as according to RSSI measurements, predicting future network conditions over a predicted length that the communication service will be in use (e.g., performed using machine learning or artificial intelligence according to historical information that trains a predictive model including historical information associated with the particular end user device, other end user devices associated with the particular user, and/or end user devices associated with other users that have utilized the same or a similar communication service such as in a same or similar geographic area).

In one embodiment of method 280, the switch or a computing device that controls or interfaces with the switch (which can include the end user device, a network element, a WiFi access point, or other computing devices) can generate a latency comparison, a throughput comparison, a security comparison, a reliability comparison, movement information or a combination thereof for the end user device executing the communication service. In one embodiment, the latency comparison comprises determining a first end-to-end latency over a cellular connection for the end user device executing the communication service, determining a second end-to-end latency over a WiFi connection via a WiFi access point for the end user device executing the communication service, and comparing the first and second end-to-end latencies. In one embodiment, the throughput comparison comprises determining a first throughput over the cellular connection for the end user device executing the communication service, determining a second throughput over the WiFi connection via the WiFi access point for the end user device executing the communication service, and comparing the first and second throughputs. In one embodiment, the movement information is a prediction for the end user device executing the communication service relative to a coverage area of the WiFi access point, such as predicting a position, an area, or a trajectory within the coverage area to facilitate analyzing conditions within the coverage area including predicting when an end user device will be near an edge of a coverage area where network performance is poorer than in a middle portion of the coverage area.

At 2808, a preference parameter can be introduced or otherwise utilized where one connection/network can be preferred over another connection/network, such as preferring WiFi over a cellular connection/network, provided that one or more thresholds for the selected parameter(s) are satisfied. For example, if the WiFi connection (or other preferred network) satisfies the thresholds for the selected parameters then at 2810 the switching decision can be made to utilize the WiFi connection (or other preferred network). In this example, if the end user device is already utilizing the WiFi network (or other preferred network) then no switch is needed, otherwise the switch can be employed to switch the connection of the end user device from the cellular network (or other non-preferred network) to the WiFi network (or other preferred network). In one or more embodiments, a network preference can be based on various criteria and can be a pre-determined or real-time decision, such as preferring a WiFi network over a cellular network due to lower costs (e.g., provider and/or user costs), less resource usage, network conditions, service agreements with other providers, subscriber agreement, QoS requirements or guarantees, and so forth. In other embodiments, a network preference may not be utilized such that the decision to switch to a particular network and connection is based on the path/connection/network having the better parameters which can be calculated in a number of different ways as described herein. For instance, if a single selection criterion is utilized then the path with the better performance for that parameter can be selected. If on the other hand, multiple selection criteria are utilized then in one embodiment the path with better performance for more of the parameters can be selected. Other techniques for selecting the path based on parameter comparison can include utilizing a combination of best performance in one or more parameters in combination with satisfying threshold(s) for one or more other parameters, such as selecting a path with the better performance in latency when both available paths satisfy the throughput and packet loss performance thresholds. In other embodiments, the parameters can be assigned weights as described herein (e.g., according to the type of communication service) and a total score can be calculated for both paths (or all of the paths when more than two connections are available such as where WiFi access points have overlapping coverage areas). In one embodiment, the selection of the technique for evaluating the parameters can be based on various factors including the type of communication service, such as employing minimum thresholds for certain parameters that may have a stronger adverse effect on the particular service, such as a minimum latency for a latency-sensitive service.

If on the other hand back at 2808 the WiFi connection (or other preferred network) does not satisfy the thresholds for the selected parameters (or is not selected as the desired connection as described above) then at 2812 the switching decision can be made to utilize the cellular connection (or other non-preferred network). In this example, if the end user device is already utilizing the WiFi network (or other preferred network) then the switch can be employed to switch the connection of the end user device from the WiFi network (or other preferred network) to the cellular network (or other non-preferred network) otherwise the switch is not needed and the end user device can continue to utilize the cellular network (or other non-preferred network). As described above in other embodiments, a network preference may not be utilized such that the decision to switch to a particular network and connection (e.g., the cellular network) is based on the path/connection/network having the better or desired parameters, which can be calculated in a number of different ways as described herein.

In one or more embodiments, method 280 can utilize motion information to facilitate selection of the connection/network. For example, at 2814 a determination can be made as to whether the end user device is moving towards an edge of a coverage area, such as a WiFi coverage edge. Where it is determined that the end user device is moving towards the edge of the coverage area (e.g., WiFi coverage edge) then at 2816 the end user device can continue to utilize the cellular network and connection, otherwise the switch can be employed to switch the connection of the end user device from the cellular network to the WiFi network (where the WiFi network is the selected network). It should be further understood that the motion detection features can be utilized as part of the parameter comparison of step 2808 or utilized as a separate process. The motion information analysis can be implemented in a number of different ways, including predicting or forecasting device trajectory, which can be based on machine learning or artificial intelligence as described herein or can utilize other techniques such as calculating an average velocity and direction to determine a future trajectory or future position.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, the systems and methods enable switching back and forth between Wi-Fi and cellular networks (and/or other types of networks) to get a best experience. As an example, the switching can utilize various criteria which may or may not be considered in conjunction with measured and/or predicted RF conditions. In one embodiment, latency (e.g., end-to-end or over a portion of the communication path) can be analyzed for the different available networks (e.g., cellular and WiFi). In one or more embodiments, the systems and methods enable probing for communication parameters such as throughput over the two (or more) available paths. In one embodiment, the mobility of the user device can be considered in determining the network and connection to utilize (or switch to) where the mobility analysis can be based on detecting current mobility (e.g., velocity, direction, trajectory, geographical position) and/or predicting or forecasting mobility, such as based on historical movements, current parameters, current trajectory, historical movements of other devices of a same user (e.g., a same user on a different device previously moved to position X), historical movements of other devices of different users (e.g., a different user on a different device previously moved from the current position to position X).

In one or more embodiments, the systems and methods enable switching between particular Wi-Fi hotspots such as where multiple WiFi access points have overlapping coverage areas and the user device is positioned in, or forecast to move into, the overlapping coverage area. In this example, the systems and methods enable analyzing various criteria to select between the different WiFi access points and/or different WiFi networks. In one embodiment, the systems and methods can select between the cellular network and two or more WiFi access points and/or WiFi networks. The selection criteria can include one or more of the criterion described herein including a latency comparison, a throughput comparison, a security comparison, a reliability comparison, movement information or a combination thereof for the different paths. In one or more embodiments, a prioritized or preferred list of WiFi access points or WiFi networks can be accessed as part of the decision-making process for the switching between networks. In one embodiment, a first analysis (by the switch at the end user device and/or at a network element(s)) can select multiple WiFi access points rather than a cellular network (e.g., based on one or more of lower latency, higher throughput, a security comparison, less packet loss, and movement information indicating better performance due to proximity to equipment) for providing the connection for the communication service. Continuing with this example, a second analysis (by the switch at the end user device and/or at a network element(s)) can select one of the multiple WiFi access points rather than the other WiFi access point(s) (e.g., based on one or more of the prioritized list, lower latency, higher throughput, a security comparison, less packet loss, and movement information indicating better performance due to proximity to equipment) for providing the connection for the communication service. In one or more embodiments, weighting or prioritization can be applied to multiple criteria for selecting the connection to be utilized. As an example, the weighting can be decided according to the type of communication service, such as applying weight X to latency, weight Y to throughput, and weight Z to packet loss for a video service, according to the impact on the quality of service. In other embodiments, the weighting can be decided according to other criterion (which may or may not consider the type of communication service), such as other network conditions, predicted future other network conditions, available resources, predicted future available resources, subscriber agreement, QoS agreement or guarantee, service agreements with other network providers, and so forth.

In one or more embodiments, the different networks and/or the different equipment providing access to the different networks (e.g., the cellular network, the WiFi access point(s) and/or the WiFi network(s)) can be operated by different service providers or a same service provider.

In one or more embodiments, the analysis by the systems and methods can provide a priority or ordered list for the different networks and/or the different equipment providing access to the different networks, such that the user device can switch to connection A then to connection B (e.g., if a particular performance threshold X is not maintained via connection A) then to connection C (e.g., if a particular performance threshold Y is not maintained via connection B), and so forth.

In one embodiment, the selection of the connection via the particular network can be based on optimizing one or more particular criteria described herein or can be based on satisfying particular thresholds for a group of criteria (which may or may not be an optimization of particular criterion). For example, the systems and methods can select a WiFi connection rather than a cellular connection where the latency, throughput, and packet loss for the WiFi connection all satisfy performance thresholds even though the cellular connection has a lower latency than the WiFi connection because the cellular connection has a throughput and/or a packet loss that fails to satisfy the performance thresholds.

In one or more embodiments, the environment and/or the available types of networks can be considered in selection of the particular access network (e.g., cellular vs WiFi). For example in a stadium or other environment that provides millimeter wave cellular, the user device may be connected to the millimeter wave cellular network rather than the WiFi network based at least in part on an amount of spectrum that the particular service provider can utilize. In this example, the selection decision can be made by the user device, equipment of the service provider or a combination thereof, and the decision may or may not take into account various other criteria described herein such as a prioritized list, lower latency, higher throughput, a security comparison, less packet loss, movement information indicating better performance due to proximity to equipment, other network conditions, predicted future other network conditions, available resources, predicted future available resources, subscriber agreement, QoS agreement or guarantee, service agreements with other network providers.

In one or more embodiments, machine learning can be employed to facilitate the switching decision including supervised, unsupervised, reinforcement learning, or other techniques. The machine learning can be trained on various data including different communication services, different devices of a same user, different devices of different users, a same or different geographical areas where services are provided, and so forth. In one embodiment, the machine learning can be used to predict future network parameters for a particular communication service. In one embodiment, the machine learning can be used to predict future location for a particular end user device. In one embodiment, the machine learning can be used to predict a length of time that the end user device will be executing the particular communication service.

In one embodiment, future network parameters, future location for a particular end user device, and a predicted length of time that the end user device will be executing the particular communication service can be utilized as part of making a switching decision and managing the switching between connections, including scheduling subsequent performance evaluations and switching decisions for the same communication session, setting a time period for utilizing a particular network so that the communication service can revert back to the previous network/connection when the time period expires, searching for other available networks, and so forth.

In one or more embodiments, beacon signals generated or otherwise broadcast by an access point(s) can be utilized for measuring or analyzing performance parameters for a path (e.g., WiFi path), such as throughput. In one or more embodiments, the end user device, network element, WiFi access point and/or other computing device that is determining the switching decision can employ autonomous detection of various parameters (e.g., latency, throughput, packet loss, RF conditions, etc.), such as at scheduled times or at times when resources of the device are at lower levels of use.

In one or more embodiments, the end user device can maintain a cellular connection after switching to another network (e.g., WiFi connection via WiFi access point). In this example, the switching device (or other device/logic making switching decision) can periodically or at ad-hoc time periods collect data for measuring performance of the different networks or connections, such as comparing cellular and WiFi connections. In one or more embodiments, a beacon signal can be added to cellular communication for determining network parameters, and can be utilized along with WiFI beacon signals for evaluating the performance difference between a WiFi connection and a cellular connection. In another embodiment, pinging or other measurement techniques (e.g., without beacon signals, via base stations, and/or other techniques) can be applied to the cellular connection for evaluating the performance difference between the WiFi connection and the cellular connection.

In one embodiment, the decision to switch connections can be made by the UE for delay-sensitive communication services. For example, the UE can initiate a ping to measure the end-to-end latency over the different network paths and the UE can select the path with the smallest latency. In one embodiment, the decision to switch connections can be made on the network side such as for a delay-sensitive application where the network evaluates one or more parameters and then instructs the UE (or otherwise facilitates) to switch to the selected network and connection.

In one embodiment, a gNodeB (gNB) can initiate parameter(s) testing, such as latency testing, from its location which can include end-to-end testing from the end user device to the media server/application server.

In one embodiment, switching decisions according to motion information, such as current position, speed, trajectory and so forth, can be performed by the end user device, which may have more accurate data than the network elements, such as GPS data, accelerometer data, and so forth. In one embodiment, motion information can be considered along with sensor data, such as environment imaging by a camera of the end user device, for making the switching decision. In this example, the sensor data can indicate movement into an open area, movement into an indoor area, proximity to potential interfering objects such as a tall building, and so forth, which can be considered for evaluating future performance.

In one embodiment, the type pf service can trigger a type of parameter to be evaluated including selecting uplink throughput for some services and selecting downlink throughput for other services. In one embodiment, switching decisions can be performed but a network condition threshold can be applied to the switching decisions, such as switching to a WiFi connection based on evaluation of latency, but switching back to cellular once traffic on the WiFi network reaches a first threshold and/or traffic on a cellular network drops below a second threshold. In one embodiment, a security evaluation can be based on identifying the operator of the available network(s) and obtaining a security score for the operator, where the security score can be based on past hacking activity or otherwise determined based on an evaluation of security schemes being implemented by the operator.

In one or more embodiments, a switching decision can be a multi-step process. For example, one or more first parameters can be evaluated for the different paths. If the evaluation results in a differential score that satisfies a particular threshold (e.g., one path is determined to more clearly be outperforming the other) then the switch can be performed, otherwise if the differential score does not satisfy the particular threshold (e.g., the two paths are performing similarly for the selected parameter(s)) then an additional parameter(s) can be evaluated, such as obtaining data from other sensors of the end user device that can be utilized in connection/path evaluation.

In one or more embodiments, a switching timer or delay period can be employed in which switching is not permitted, such as to avoid rapid switching back and forth between networks. In one or more embodiments, the switching timer or delay period can be adjustable (e.g., by the network and/or by the end user device) and/or different for different applications to provide flexibility and robustness for managing connections for different applications.

In one or more embodiments, detected or forecast movement by a mobile device towards a WiFi coverage edge can be a factor for the switching decision, such as avoiding a switch to that particular WiFi connection since future performance may be decreasing. In one embodiment, discovering additional WiFi coverage areas (e.g., different WiFi access points of a same or different WiFi networks) can be considered as part of the switching decision, such as skipping switching to a first WiFi access point and waiting to enter a coverage area of a second WiFi access point.

In one or more embodiments, the switching evaluations can be performed by multiple devices, including one or more of the end user device, the network element of a first network (e.g., a cellular network), an access point of a second network (e.g., a WiFi access point), and so forth. In this example, the switching decision can be based on one, some or all of the switching evaluations. For instance, evaluations and switching recommendations can be compared to see if they are in agreement and if so then the switching can follow the agreeing recommendations, otherwise the switching can be based on a conflict resolution process, such as following the network decision rather than the UE decision, following the network decision for a first group of services but following the UE decision for a second group of services, or other policies for resolving conflict. In one or more embodiments, the switching evaluations can be combined, such as one or more first parameters (for a first path or for multiple paths) being evaluated by one device (e.g., end user device) and one or more second parameters (for a second path or for multiple paths) being evaluated by a second device (e.g., network element), where a decision-making device, such as either the end user device or the network element, can have access to the multiple evaluations in order to make a decision. In one or more embodiments, the switching evaluations can be performed by multiple devices based on one device evaluating current parameters (e.g., the end user device) while another device evaluates future parameters (e.g., the network element such as based on machine learning). In this example, a first switching decision can be made based on the evaluation of the current parameters while a second future decision can be made based on the future parameters, such as switching to a WiFi connection for 20 minutes (based on current parameters favoring performance via the WiFi connection) and scheduling a second switch back to the cellular connection after the twenty minutes has expired (based on the future parameters favoring performance via the cellular connection).

Figure 3:
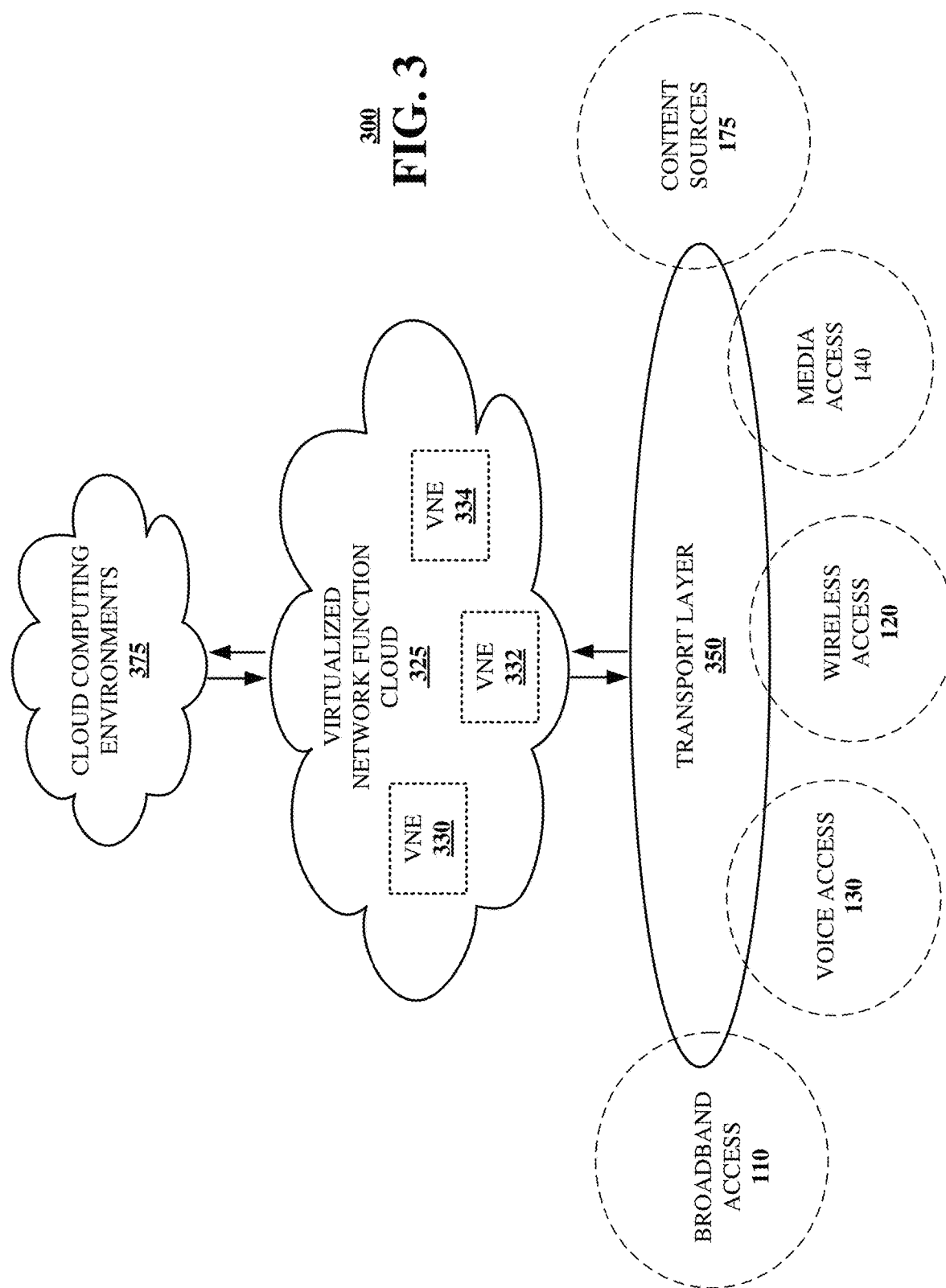
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 280 presented in FIGS. 1, 2A, 2B, and 3. For example, virtualized communication network 300 can facilitate in whole or in part selecting a latency comparison, a throughput comparison, a security comparison, a reliability comparison, movement information or a combination thereof for an end user device executing a communication service according to a service type resulting in a selection criteria, where the latency comparison is based on end-to-end latency measured over a cellular connection and measured over a WiFi connection via a WiFi access point, where the throughput comparison is based on throughput measured over the cellular connection and measured over the WiFi connection via the WiFi access point, where the throughput comparison is based on security ratings determined for the cellular connection and determined for the WiFi connection via the WiFi access point, where the reliability comparison is based on packet loss measured over the cellular connection and measured over the WiFi connection via the WiFi access point, where the movement information is a prediction for the end user device relative to a coverage area of the WiFi access point; and generating a switching decision by selecting one of the cellular connection or the WiFi connection according to the latency comparison, the throughput comparison, the security comparison, the reliability comparison, the movement information, or the combination thereof.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
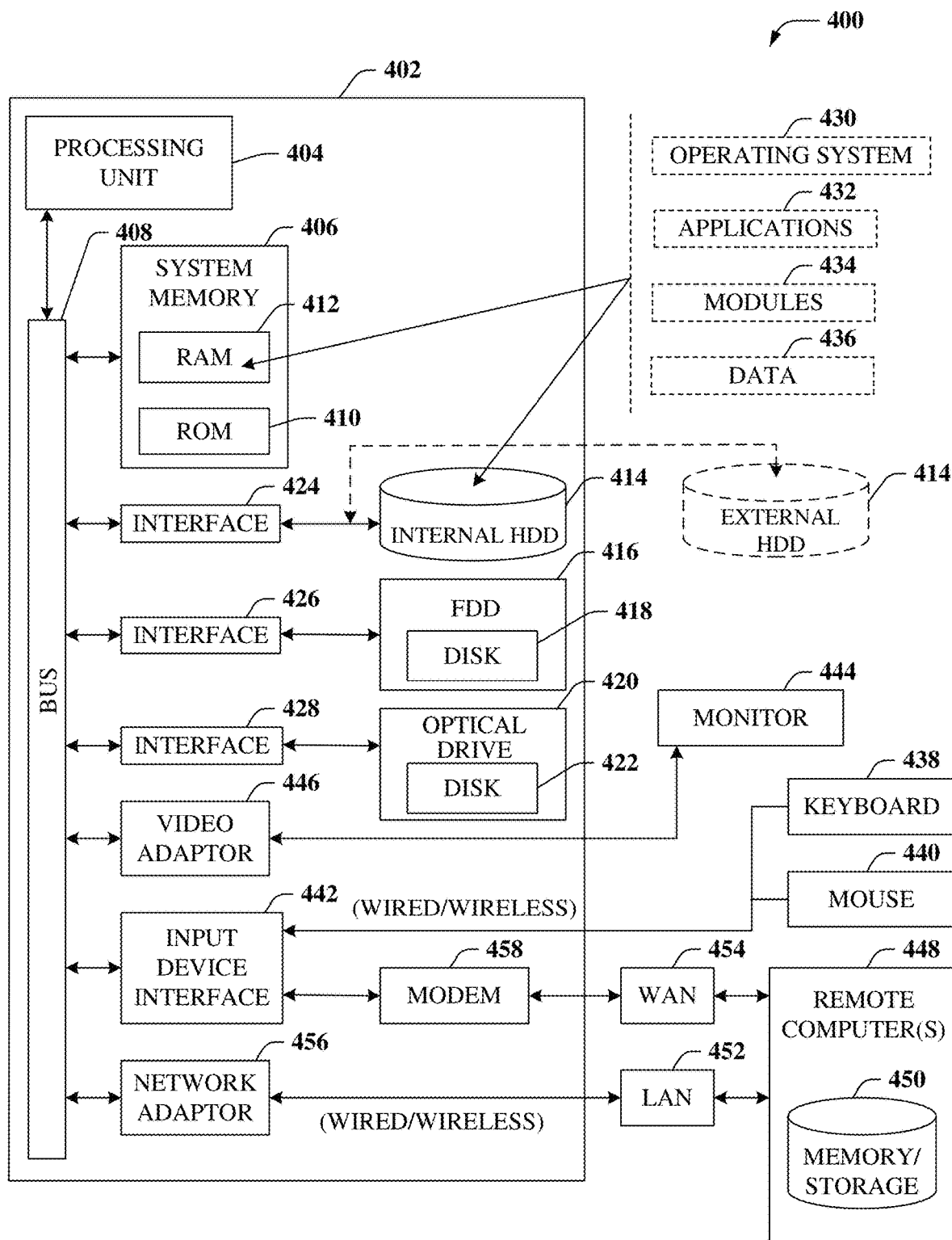
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part selecting a latency comparison, a throughput comparison, a security comparison, a reliability comparison, movement information or a combination thereof for an end user device executing a communication service according to a service type resulting in a selection criteria, where the latency comparison is based on end-to-end latency measured over a cellular connection and measured over a WiFi connection via a WiFi access point, where the throughput comparison is based on throughput measured over the cellular connection and measured over the WiFi connection via the WiFi access point, where the throughput comparison is based on security ratings determined for the cellular connection and determined for the WiFi connection via the WiFi access point, where the reliability comparison is based on packet loss measured over the cellular connection and measured over the WiFi connection via the WiFi access point, where the movement information is a prediction for the end user device relative to a coverage area of the WiFi access point; and generating a switching decision by selecting one of the cellular connection or the WiFi connection according to the latency comparison, the throughput comparison, the security comparison, the reliability comparison, the movement information, or the combination thereof.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
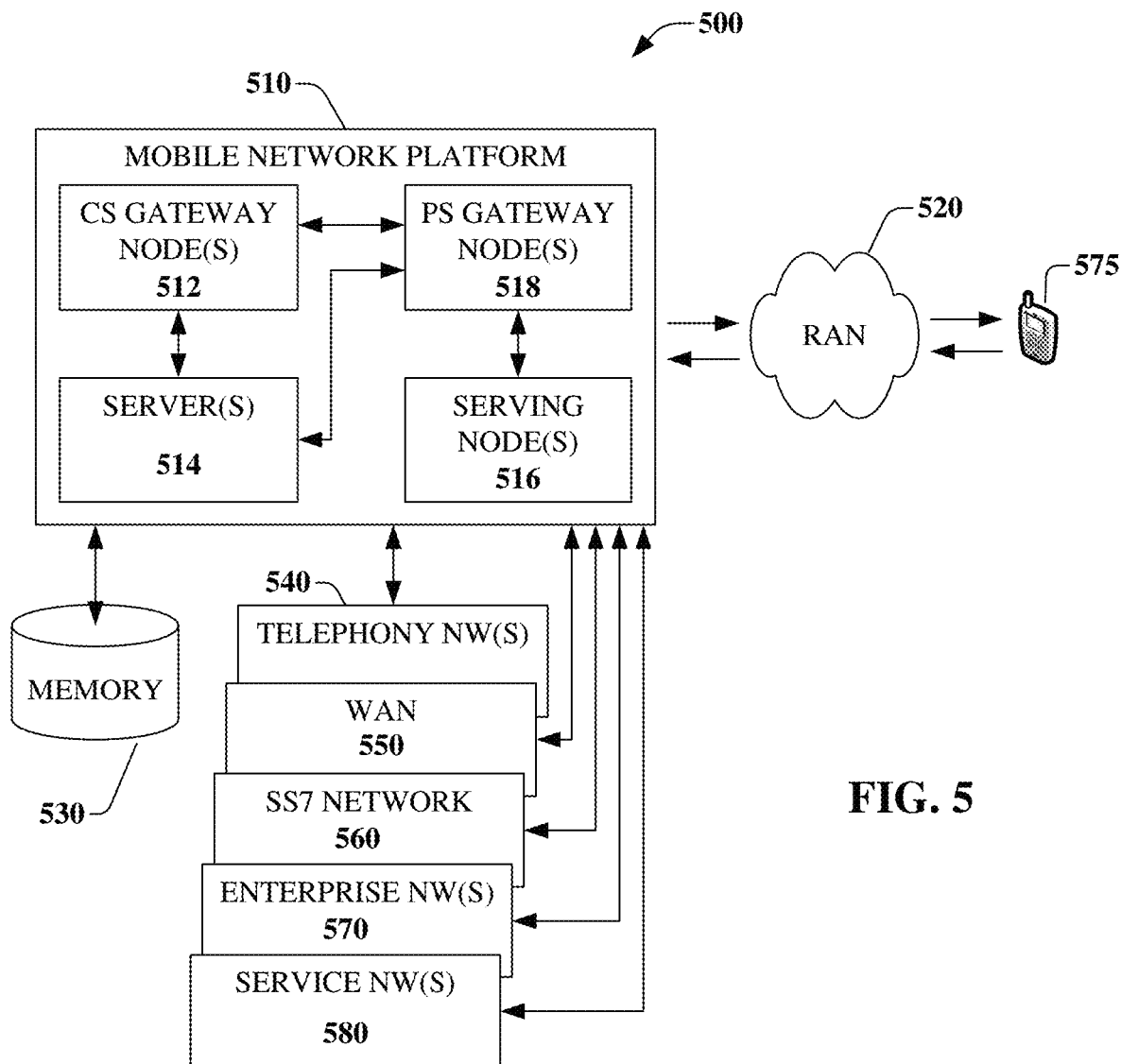
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part selecting a latency comparison, a throughput comparison, a security comparison, a reliability comparison, movement information or a combination thereof for an end user device executing a communication service according to a service type resulting in a selection criteria, where the latency comparison is based on end-to-end latency measured over a cellular connection and measured over a WiFi connection via a WiFi access point, where the throughput comparison is based on throughput measured over the cellular connection and measured over the WiFi connection via the WiFi access point, where the throughput comparison is based on security ratings determined for the cellular connection and determined for the WiFi connection via the WiFi access point, where the reliability comparison is based on packet loss measured over the cellular connection and measured over the WiFi connection via the WiFi access point, where the movement information is a prediction for the end user device relative to a coverage area of the WiFi access point; and generating a switching decision by selecting one of the cellular connection or the WiFi connection according to the latency comparison, the throughput comparison, the security comparison, the reliability comparison, the movement information, or the combination thereof.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
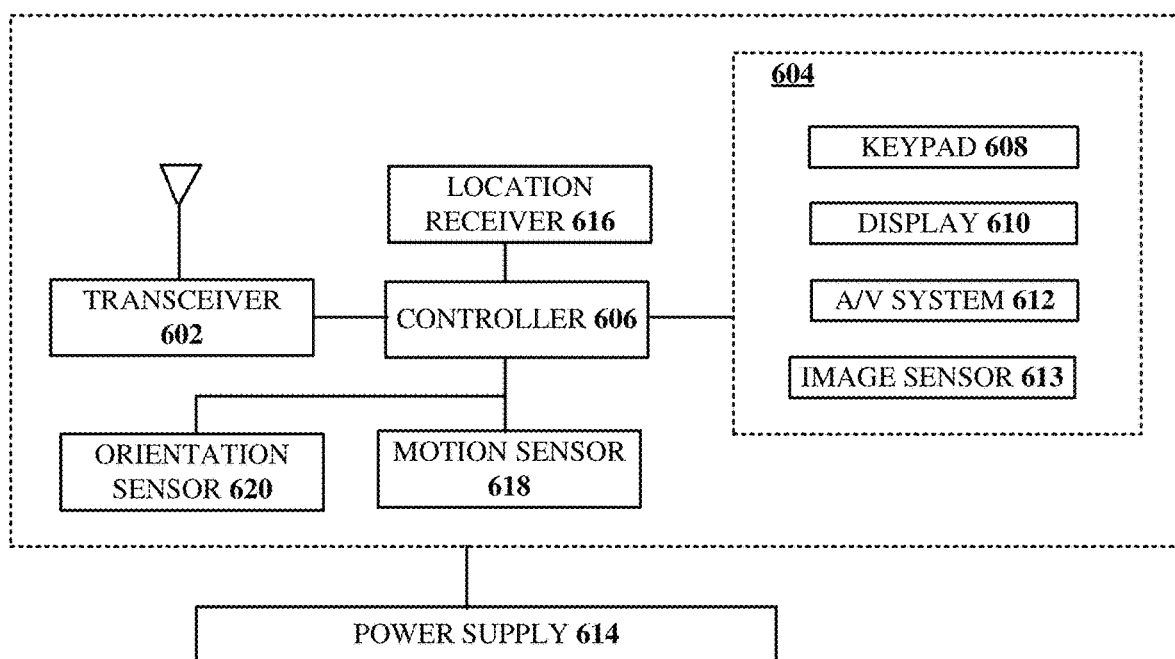
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part selecting a latency comparison, a throughput comparison, a security comparison, a reliability comparison, movement information or a combination thereof for an end user device executing a communication service according to a service type resulting in a selection criteria, where the latency comparison is based on end-to-end latency measured over a cellular connection and measured over a WiFi connection via a WiFi access point, where the throughput comparison is based on throughput measured over the cellular connection and measured over the WiFi connection via the WiFi access point, where the throughput comparison is based on security ratings determined for the cellular connection and determined for the WiFi connection via the WiFi access point, where the reliability comparison is based on packet loss measured over the cellular connection and measured over the WiFi connection via the WiFi access point, where the movement information is a prediction for the end user device relative to a coverage area of the WiFi access point; and generating a switching decision by selecting one of the cellular connection or the WiFi connection according to the latency comparison, the throughput comparison, the security comparison, the reliability comparison, the movement information, or the combination thereof.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
determining a first end-to-end latency over a cellular connection for an end user device executing a communication service;
predicting a second end-to-end latency over a WiFi connection via a WiFi access point for the end user device executing the communication service;
comparing the first and second end-to-end latencies resulting in a latency comparison;
determining a first throughput over the cellular connection for the end user device executing the communication service;
predicting a second throughput over the WiFi connection via the WiFi access point for the end user device executing the communication service;
comparing the first and second throughputs resulting in a throughput comparison;
predicting movement information for the end user device executing the communication service relative to a coverage area of the WiFi access point;
generating a switching instruction according to the latency comparison, the throughput comparison, and the movement information, the switching instruction selecting one of the cellular connection or the WiFi connection; and
transmitting the switching instruction to the end user device.

2. The device of claim 1, wherein the predicting of the second end-to-end latency and the second throughput over the WiFi connection is based on a beacon signal of the WiFi access point, wherein the transmitting of the switching instruction causes the end user device to switch to the WiFi connection, and wherein the cellular connection is maintained after the end user device switches to the WiFi connection.

3. The device of claim 2, wherein the operations further comprise:
   determining a third end-to-end latency over the cellular connection for the end user device executing the communication service;
   predicting a fourth end-to-end latency over the WiFi connection via the WiFi access point for the end user device executing the communication service;
   comparing the third and fourth end-to-end latencies resulting in a second latency comparison;
   determining a third throughput over the cellular connection for the end user device executing the communication service;
   predicting a fourth throughput over the WiFi connection via the WiFi access point for the end user device executing the communication service;
   comparing the third and fourth throughputs resulting in a second throughput comparison;
   predicting second movement information for the end user device executing the communication service relative to the coverage area of the WiFi access point;
   generating a second switching instruction according to the second latency comparison, the second throughput comparison, and the second movement information, the second switch instruction selecting one of the cellular connection or the WiFi connection; and
   transmitting the second switching instruction to the end user device.

4. The device of claim 2, wherein the operations further comprise:
   determining a third end-to-end latency over the cellular connection for the end user device executing the communication service;
   predicting a fourth end-to-end latency over a second WiFi connection via a second WiFi access point for the end user device executing the communication service;
   comparing the third and fourth end-to-end latencies resulting in a second latency comparison;
   determining a third throughput over the cellular connection for the end user device executing the communication service;
   predicting a fourth throughput over the second WiFi connection via the second WiFi access point for the end user device executing the communication service;
   comparing the third and fourth throughputs resulting in a second throughput comparison;
   predicting second movement information for the end user device executing the communication service relative to a second coverage area of the second WiFi access point;
   generating a second switching instruction according to the second latency comparison, the second throughput comparison, and the second movement information, the second switch instruction selecting one of the cellular connection or the second WiFi connection; and
   transmitting the second switching instruction to the end user device.

5. The device of claim 1, wherein the operations further comprise:
   determining a service type for the communication service executing on the end user device; and
   selecting between uplink throughput and downlink throughput according to the service type, wherein the first and second throughputs are one of the uplink throughput or the downlink throughput according to the selecting.

6. The device of claim 1, wherein the operations further comprise:
   determining a first RF condition for signals over the cellular connection for the end user device executing the communication service;
   predicting a second RF condition for signals over the WiFi connection via the WiFi access point for the end user device executing the communication service, wherein the first and second RF conditions are a same type of parameter; and
   comparing the first and second RF conditions resulting in an RF condition comparison, wherein the generating of the switching instruction is based in part on the RF condition comparison.

7. The device of claim 6, wherein the operations further comprise:
   determining a service type for the communication service executing on the end user device; and
   determining weights for each of the latency comparison, the throughput comparison, the movement information, and the RF condition comparison resulting in a prioritization of criteria, wherein the generating of the switching instruction is based in part on the weights.

8. The device of claim 1, wherein the operations further comprise:
   determining a third end-to-end latency over a second WiFi connection via a second WiFi access point for the end user device executing the communication service, wherein the latency comparison includes comparing the first, second and third end-to-end latencies; and
   determining a third throughput over the second WiFi connection via the second WiFi access point for the end user device executing the communication service, wherein the throughput comparison includes comparing the first, second and third throughputs, wherein the movement information further comprises the prediction for the end user device executing the communication service relative to a second coverage area of the second WiFi access point.

9. The device of claim 1, wherein the generating the switching instruction is based in part on environment data captured by a sensor of the end user device.

10. The device of claim 1, wherein the operations further comprise:
    determining network conditions associated with a network providing the cellular connection; and
    determining available spectrum associated with the cellular connection, wherein the generating the switching instruction is based in part on the network conditions and the available spectrum.

11. A non-transitory machine-readable medium, comprising executable instructions that, when executed by a processing system including a processor of an end user device, facilitate performance of operations, the operations comprising:
    determining a first end-to-end latency over a cellular connection for an end user device executing a communication service;

predicting a second end-to-end latency over a WiFi connection via a WiFi access point for the end user device executing the communication service;
comparing the first and second end-to-end latencies resulting in a latency comparison;
determining a first throughput over the cellular connection for the end user device executing the communication service;
predicting a second throughput over the WiFi connection via the WiFi access point for the end user device executing the communication service;
comparing the first and second throughputs resulting in a throughput comparison;
predicting movement information for the end user device executing the communication service relative to a coverage area of the WiFi access point;
generating a switching instruction according to the latency comparison, the throughput comparison, and the movement information, the switching instruction selecting one of the cellular connection or the WiFi connection; and
transmitting the switching instruction to the end user device.

12. The non-transitory machine-readable medium of claim 11, wherein the predicting of the second end-to-end latency and the second throughput over the WiFi connection is based on a beacon signal of the WiFi access point, wherein the transmitting of the switching instruction causes the end user device to switch to the WiFi connection, and wherein the cellular connection is maintained after the end user device switches to the WiFi connection.

13. The non-transitory machine-readable medium of claim 12, wherein the operations further comprise:
determining a third end-to-end latency over the cellular connection for the end user device executing the communication service;
predicting a fourth end-to-end latency over the WiFi connection via the WiFi access point for the end user device executing the communication service;
comparing the third and fourth end-to-end latencies resulting in a second latency comparison;
determining a third throughput over the cellular connection for the end user device executing the communication service;
predicting a fourth throughput over the WiFi connection via the WiFi access point for the end user device executing the communication service;
comparing the third and fourth throughputs resulting in a second throughput comparison;
predicting second movement information for the end user device executing the communication service relative to the coverage area of the WiFi access point;
generating a second switching instruction according to the second latency comparison, the second throughput comparison, and the second movement information, the second switch instruction selecting one of the cellular connection or the WiFi connection; and
transmitting the second switching instruction to the end user device.

14. The non-transitory machine-readable medium of claim 12, wherein the operations further comprise:
determining a third end-to-end latency over the cellular connection for the end user device executing the communication service;
predicting a fourth end-to-end latency over a second WiFi connection via a second WiFi access point for the end user device executing the communication service;
comparing the third and fourth end-to-end latencies resulting in a second latency comparison;
determining a third throughput over the cellular connection for the end user device executing the communication service;
predicting a fourth throughput over the second WiFi connection via the second WiFi access point for the end user device executing the communication service;
comparing the third and fourth throughputs resulting in a second throughput comparison;
predicting second movement information for the end user device executing the communication service relative to a second coverage area of the second WiFi access point;
generating a second switching instruction according to the second latency comparison, the second throughput comparison, and the second movement information, the second switch instruction selecting one of the cellular connection or the second WiFi connection; and
transmitting the second switching instruction to the end user device.

15. The non-transitory machine-readable medium of claim 11, wherein the operations further comprise:
determining a service type for the communication service executing on the end user device; and
selecting between uplink throughput and downlink throughput according to the service type, wherein the first and second throughputs are one of the uplink throughput or the downlink throughput according to the selecting.

16. The non-transitory machine-readable medium of claim 11, wherein the operations further comprise:
determining a first RF condition for signals over the cellular connection for the end user device executing the communication service;
predicting a second RF condition for signals over the WiFi connection via the WiFi access point for the end user device executing the communication service, wherein the first and second RF conditions are a same type of parameter; and
comparing the first and second RF conditions resulting in an RF condition comparison, wherein the generating of the switching instruction is based in part on the RF condition comparison.

17. The non-transitory machine-readable medium of claim 16, wherein the operations further comprise:
determining a service type for the communication service executing on the end user device; and
determining weights for each of the latency comparison, the throughput comparison, the movement information, and the RF condition comparison resulting in a prioritization of criteria, wherein the generating of the switching instruction is based in part on the weights.

18. The non-transitory machine-readable medium of claim 11, wherein the operations further comprise:
determining a third end-to-end latency over a second WiFi connection via a second WiFi access point for the end user device executing the communication service, wherein the latency comparison includes comparing the first, second and third end-to-end latencies; and
determining a third throughput over the second WiFi connection via the second WiFi access point for the end user device executing the communication service, wherein the throughput comparison includes comparing the first, second and third throughputs, wherein the movement information further comprises the prediction for the end user device executing the communication service relative to a second coverage area of the second WiFi access point.

19. The non-transitory machine-readable medium of claim 11, wherein the generating the switching instruction is based in part on environment data captured by a sensor of the end user device.

20. A method comprising:

- determining, by a processing system including a processor, a first end-to-end latency over a cellular connection for an end user device executing a communication service;
- predicting, by the processing system, a second end-to-end latency over a WiFi connection via a WiFi access point for the end user device executing the communication service;
- comparing, by the processing system, the first and second end-to-end latencies resulting in a latency comparison;
- determining, by the processing system, a first throughput over the cellular connection for the end user device executing the communication service;
- predicting, by the processing system, a second throughput over the WiFi connection via the WiFi access point for the end user device executing the communication service;
- comparing, by the processing system, the first and second throughputs resulting in a throughput comparison;
- predicting, by the processing system, movement information for the end user device executing the communication service relative to a coverage area of the WiFi access point;
- generating, by the processing system, a switching instruction according to the latency comparison, the throughput comparison, and the movement information, the switching instruction selecting one of the cellular connection or the WiFi connection; and
- transmitting, by the processing system, the switching instruction to the end user device.

* * * * *